Sept. 10, 1968  C. N. KIMBERLIN, JR  3,401,011
DEHYDRATION MAGNESIUM CHLORIDE ROASTING AND SOLVENT
Filed June 21, 1965
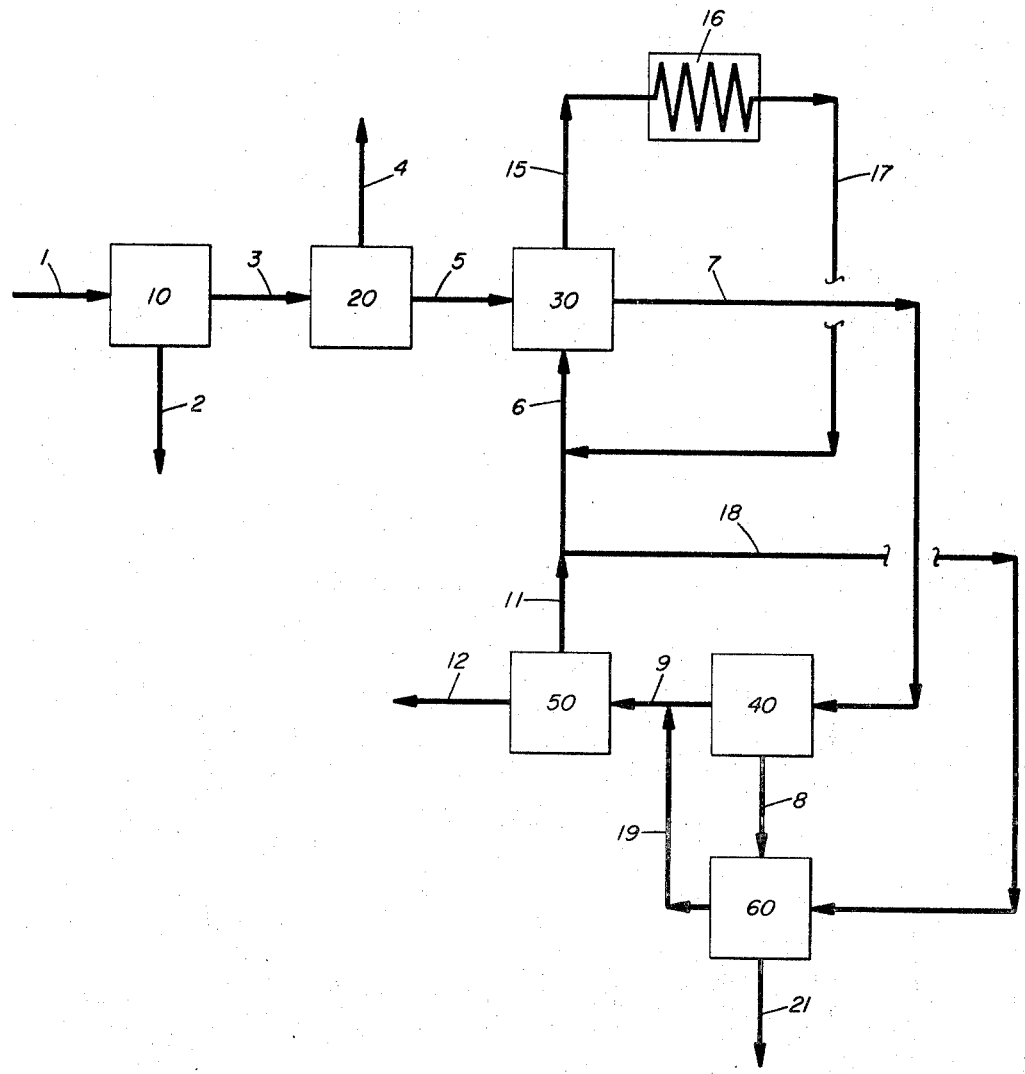
CHARLES N. KIMBERLIN, JR.  INVENTOR
BY W. O. T Heilman
PATENT ATTORNEY United States Patent Office 3,401,011
Patented Sept. 10, 1968

3,401,011
DEHYDRATION MAGNESIUM CHLORIDE
ROASTING AND SOLVENT
Charles Newton Kimberlin, Jr., Baton Rouge, La., assignor to Esso Research and Engineering Company, a corporation of Delaware
Filed June 21, 1965, Ser. No. 465,495
5 Claims. (Cl. 23—91)

ABSTRACT OF THE DISCLOSURE

Anhydrous magnesium chloride is produced from carnallite by heating to remove the water of hydration. The dehydrated mixture is then contacted with boiling methyl alcohol to dissolve the magnesium chloride which is passed through a filtering zone to remove impurities. The solution is then treated to remove the methyl alcohol and secure anhydrous magnesium chloride.

---

The present invention is concerned with the dehydration of magnesium chloride so as to produce a high quality, anhydrous magnesium chloride product which may be further processed as, for example, by means of an electrolytic cell. The present invention is specifically concerned with a technique for the dehydration of magnesium chloride utilizing a plurality of integrated processing zones wherein the last traces of water are removed. The invention is particularly concerned with the dehydration of carnallite wherein the carnallite is roasted under critical conditions and then treated with methyl alcohol.

It is known in the art that magnesium chloride generally contains associated therewith about 6 molecules of water of hydration ($MgCl_2 6H_2O$). It is also known in the art that by general dehydration processes such as simple heating it is possible to remove about four molecules of water of hydration without securing undesirable side reactions. However, if further dehydration is continued by known techniques in order to remove the remaining two molecules of water, undesirable side reactions occur, such as the formation of magnesium hydroxy chloride, magnesium oxide and hydrochloric acid. This is very undesirable, particularly if the magnesium chloride is to be further processed by electrolysis.

However, it is also known in the art that certain double salts of magnesium chloride such as magnesium potassium chloride ($MgCl_2 \cdot KCl \cdot 6H_2O$), or carnallite, are very easily dehydrated by heating without the occurrence of undesirable side reactions. However, the product of this dehydration, an equimolar mixture of anhydrous magnesium and potassium chlorides is not satisfactory for further processing by electrolysis to produce magnesium metal due to its very high content of potassium chloride. This is especially true in the case of naturally occurring carnallite, which in addition to the potassium chloride combined with the magnesium chloride also contains other salts such as an excess of potassium chloride, sodium chloride, calcium chloride, magnesium sulfate, etc., as well as other impurities such as gangue, clay, sand, stones, etc.

It has been discovered that if a plurality of interrelated stages or reaction zones are employed which utilizes the technique of heating the natural carnallite and then subjecting the same to a solvent action of high quality methyl alcohol dehydrated magnesium chloride may be produced. The present invention may be more fully understood by referring to the drawing illustrating one embodiment of the same. Referring specifically to the drawing, carnallite as mined, is introduced into a concentration zone 10 by means of line 1. The ores mined contain, in addition to carnallite and other salts, other impurities such as gangue, clay, sand, stones, etc. Conventional techniques may be used in zone 10 in order to remove most of these undesirable materials which are separated by means of line 2. A relatively concentrated carnallite ore is removed from zone 10 by means of line 3 and introduced into a roasting zone 20. The carnallite ore removed by means of line 3 contains water of hydration along with impurities such as excess potassium chloride, sodium chloride, magnesium sulfate, clay, sand, etc.

The ore in roasting zone 20 is subjected to a temperature in the range from about 450–700° F. preferably about 600° F. and at atmospheric pressure. The time of residence of the carnallite in zone 20 is in the range of from 1 to 4 hours, preferably about 2 hours. Under these conditions, the water of hydration is removed and is separated as a vapor by means of line 4. The dehydrated magnesium chloride containing associated therewith potassium chloride, sodium chloride, etc., is removed from roasting zone 20 by means of line 5, cooled and then introduced into zone 30 where the same is contacted with a methyl alcohol solvent to dissolve the magnesium chloride. The amount of impurities in the dehydrated carnallite associated with the magnesium chloride which is introduced into zone 30 is in the range from about 50 to 90% by weight, generally about 75% by weight. Methyl alcohol is introduced into zone 30 by means of line 6.

The temperature maintained in zone 30 is in the range from about 100 to 150° F., preferably about 140° F. The pressure maintained in zone 30 is in the range of from 0 to 20 p.s.i.g., preferably about 10 p.s.i.g. Under these conditions the impurities such as potassium chloride and sodium chloride, are not dissolved in the solvent. Effluent from zone 30 is passed into a filtering zone 40 by means of line 7 wherein suitable means are utilized to separate the insoluble impurities from the solution. The impurities are removed by means of line 8. The concentration of magnesium chloride in the methyl alcohol is in the range from 5 to 25% by weight, preferably about 10% by weight.

The solution of magnesium chloride in methyl alcohol is removed from filter zone 14 by means of line 9 and introduced into a solvent evaporation zone 50. Temperature and pressure conditions are adjusted in zone 50 to remove the methyl alcohol by means of line 11 which is preferably condensed and recycled to the system. A dehydrated, high quality magnesium chloride is removed from zone 50 by means of line 12 and further processed as desired.

The leaching conditions in zone 30 are such that the methyl alcohol may be boiling. Alcohol vapors are removed from zone 30 by means of line 15, condensed in zone 16 and recycled to the system by means of line 17. Any type of suitable heating means may be utilized in zone 30 to maintain the methyl alcohol at its boiling point. The time of residence in zone 30 is in the range of about 30 to 120 minutes, preferably about 60 minutes. It is preferred to remove the solid impurities by means of line 8 and introduce the same into zone 60 where they are washed with additional methyl alcohol introduced by means of line 18 and removed by means of line 19 so as to completely recover the dissolved magnesium chloride. The solution removed by means of line 19 is introduced into distillation zone 50. Washed solids are removed from zone 60 by means of line 21 and disposed of as desired.

In order to further illustrate the invention the following example is given.

Example

One thousand parts of carnallite from New Mexico containing 178 parts of $MgCl_2$ and 205 parts of water were dehydrated by heating for three hours to 500° F. The dehydrated carnallite was extracted with about 2500 parts of boiling anhydrous methanol for one hour. The insoluble residue was filtered and washed by decantation twice with about 1200 parts of methanol. The combined methanol extracts were filtered and evaporated to dryness under vacuum. The product remaining comprised 168 parts of anhydrous magnesium chloride containing small amounts of potassium and sodium chlorides. This material is suitable as a cell feed for the production of magnesium by electrolysis.

What is claimed is:

1. Method for the recovery of anhydrous magnesium chloride from carnallite which comprises subjecting the carnallite in a roasting zone to a temperature in the range from about 450° to 700° F. for a time period of from about 1–4 hours to remove the water of hydration, thereafter contacting the anhydrous carnallite in a leaching zone at a temperature in the range of from about 100° F. to about 150° F. with a solvent consisting essentially of anhydrous boiling methyl alcohol for a time period in the range from about 30 to 120 minutes to dissolve the anhydrous magnesium chloride, removing undissolved solid contaminants from the methyl alcohol-magnesium chloride solution, thereafter subjecting the methyl alcohol-magnesium chloride solution to temperature and pressure conditions to distill the alcohol from the anhydrous magnesium chloride.

2. Process as defined by claim 1 wherein the temperature maintained in the roasting zone is about 600° F. wherein said zone is maintained at about atmospheric pressure.

3. Process as defined by claim 1 wherein the pressure maintained in the leaching zone is about 10 p.s.i.g.

4. Process as defined by claim 1 wherein the amount of methyl alcohol used is sufficient to produce a magnesium chloride methyl alcohol solution having a magnesium chloride concentration in the range from about 5–25% by weight.

5. Process as defined by claim 4 wherein the concentration of the magnesium chloride in the solution is about 10% by weight.

References Cited

UNITED STATES PATENTS

| 1,875,013 | 8/1932 | Kaselitz | 23—91 X |
| 2,381,994 | 8/1945 | Belchetz | 23—91 |
| 2,381,995 | 8/1945 | Belchetz | 23—91 |
| 2,479,001 | 8/1949 | Burke et al. | 23—91 |

FOREIGN PATENTS

| 260,141 | 5/1913 | Germany. |

OSCAR R. VERTIZ, *Primary Examiner.*

E. STERN, *Assistant Examiner.*